United States Patent [19]
Shu et al.

[11] Patent Number: 5,838,885
[45] Date of Patent: Nov. 17, 1998

[54] SALT-AND-PEPPER-NOISE REDUCTION

[75] Inventors: Joseph Shu, San Jose; Jack Boyce, El Cerrito, both of Calif.

[73] Assignee: Seiko Epson Corporation, Tokyo, Japan

[21] Appl. No.: 709,682

[22] Filed: Sep. 9, 1996

[51] Int. Cl.⁶ .................................................. G06K 15/00
[52] U.S. Cl. ......................................... 395/109; 395/102
[58] Field of Search .................................... 395/101, 102, 395/109; 345/186, 510; 358/533, 534, 535, 529, 536, 298; 382/293, 298, 299, 275, 162, 163, 167

[56] References Cited

U.S. PATENT DOCUMENTS

| | | |
|---|---|---|
| 4,682,186 | 7/1987 | Sasaki et al. . |
| 4,959,790 | 9/1990 | Morgan . |
| 5,031,050 | 7/1991 | Chan ....................................... 358/298 |
| 5,111,302 | 5/1992 | Chan et al. . |
| 5,387,987 | 2/1995 | Ino . |
| 5,402,245 | 3/1995 | Motta et al. . |
| 5,428,377 | 6/1995 | Stoffel et al. . |
| 5,469,276 | 11/1995 | Shu . |
| 5,473,446 | 12/1995 | Perumal, Jr. et al. . |
| 5,475,800 | 12/1995 | Vaughn et al. . |
| 5,488,672 | 1/1996 | Mita . |
| 5,488,673 | 1/1996 | Katayama et al. . |
| 5,497,180 | 3/1996 | Kawakami et al. . |
| 5,675,716 | 10/1997 | Shu ........................................ 395/109 |

OTHER PUBLICATIONS

Foley, James D., et al., *Computer Graphics*, Second Edition, Addison–Wesley Publishing Company Nov. 93.

*Primary Examiner*—Arthur G. Evans

[57] ABSTRACT

In a controller for an ink-jet printer that employs both a colored-ink cartridge and a black-ink cartridge, an error-diffusion-type half-toning operation (62) determines a binary value ($K_B$) for the black component independently of the half-toning performed to determine binary values ($C_B$, $M_B$, $Y_B$) for the color components. Furthermore, the commands that specify the pixel locations at which black ink is to be deposited are determined in accordance with the binary black value $K_B$ independently of the commands for colored ink. Together with an undercolor-removal process (59) in which a high-resolution black-component input to the half-toning process is significantly less than the minimum of the values of the color components throughout most of their range, this arrangement minimizes the salt-and-pepper noise that can otherwise afflict printers in which the black and colored inks are applied from different ink cartridges.

18 Claims, 6 Drawing Sheets

SALT-AND-PEPPER-NOISE REDUCTION

BACKGROUND OF THE INVENTION

The present invention is directed to ink-jet printers and in particular to printers that have both black-ink and colored-ink cartridges.

A digitally expressed color image is quite often stored or expressed as three-dimensional values of picture elements ("pixels") that in combination make up the image. The pixel value represents a location in a color space. Most typically, that color space is the red-green-blue color space or, complementarily, the cyan-magenta-yellow color space. That is, the color components respectively represent red, green, and blue or cyan, magenta, and yellow. Other color spaces are used less frequently.

Most digital imaging systems express the pixel-value components with a relatively fine value resolution at some point in the processing. (Note that we refer here to value resolution, e.g., eight bits per pixel component, as opposed to spatial resolution, e.g., 300 dots per inch.) Eight bits per pixel component is a common component-value resolution. With such value resolution, each component can have a value between 0 and 255 ($2^8-1=255$). Although the components are thus limited to discrete values, the large number of such values has given rise to the expression continuous tone to images so expressed. In contrast, although there are some printers that apply ink dots of different sizes, most apply only single-sized dots, so the control for a given color component is binary: the dot is either applied or not at any given pixel location.

To employ such single-bit-resolution control to simulate the higher component-value resolution of the original pixels, printer drivers employ half-toning, which yields different intensity effects by applying dots in different percentages of the output-pixel locations. If the component-value range is 255, for instance, and a particular component's value is 255 throughout a region, then all pixel locations in that region receive a dot of the ink whose color is associated with that component. If the component value is 128, on the other hand, only 128 out of every 255 pixels receive ink of that color.

Inks combine subtractively. That is, if the paper or other medium on which the ink is deposited is white, so that the color reflected from it contains three primary colors red, green, and blue, and if two coincidentally deposited ink spots are of cyan and magenta, which respectively remove, or "subtract" red and green, then the remaining color is blue, i.e., the color that results from removing both the red component and the green component from the white of the paper. To produce black, a printer that employs those three colors deposits all of them at the same place and thereby removes all of white's primary colors, producing black.

Of course, the desired black can be obtained by simply using black ink if the printer is capable of depositing black ink as well as cyan, magenta, and yellow. And there are reasons why using black ink in place of the cyan-magenta-yellow combination is preferable in many situations. So if the printer can deposit black ink as well as colored ink, a printer driver will often cause the printer to deposit black ink at various locations on the output medium and use less of the colored inks. The ways in which the dark-ink locations are determined differ from driver to driver. One approach is simply to know where the half-toning process would otherwise result in all three components' being deposited and to deposit a single dot of black ink in place of the three coincident colored dots.

Another approach is actually to perform the half-toning operation on a high-resolution black value determined by some type of undercolor-removal routine from the three high-resolution color components. This high-resolution black component is then applied to a half-toning operation, and corresponding half-toning operations are performed on color components that have been adjusted for the fact that a black component has been added.

Although this replacement of colored dots with black dots is advantageous in many respects, it places severe constraints on the ink-cartridge mounting. Specifically, a printer that employs both black ink and colored ink typically uses a black-ink cartridge separate from its colored-ink cartridge. So the relative positioning of the two cartridges must be controlled with a high degree of precision if the actual position at which the printer deposits a drop of black ink requested for a given nominal pixel position is not to differ noticeably from that at which a colored-ink dot requested would be deposited for the same nominal pixel position. The undesirable result of failing to achieve this proper registration can be appreciated by referring to FIGS. 1 and 2.

FIG. 1 depicts the actual locations on a paper or other medium where the printer deposits ink in response to requests for colored ink at four nominal pixel locations. Location 12 contains the letter C to indicate that this location receives only cyan ink. Locations 14 and 16 contain C and M, to indicate that each receives both cyan and magenta ink at the same location; since the three color components come from the same cartridge, it ordinarily is not difficult for the cyan and magenta ink dots requested for the same nominal pixel location actually to be deposited at essentially the same physical location. The C, M, and Y contents of location 18 similarly represent the coincidence of three ink dots.

Since location 18 receives all three subtractive components, which nominally should remove all three of the primary colors, the resultant color should be black. But the result may not be as high in blackness quality as it would be if an actual black dot were deposited. This is one reason why printer drivers often substitute black ink for the three colored inks if the printer is capable of such a substitution.

But if the printer or its cartridges have not been manufactured with enough accuracy, the result of such a substitution can be of the type that FIG. 2 depicts. Specifically, the actual location 18 at which the three coincident dots were deposited in FIG. 1 no longer receives colored dots. A black dot is requested for the same nominal location, but it actually is deposited not at location 18 but rather at location 20, i.e., a location that nearly coincides with the actual location at which the printer deposits a colored-ink dots requested for a different nominal location. As a result, the intended generally smooth overall color impression is interrupted by "salt-and-pepper" noise, consisting of unintended white spots such as that at location 18 and unintended dark spots such as that which results from the near coincidence of locations 16 and 20. In the past, avoiding this result without the high expense of relatively high-precision equipment has meant settling for the relatively low black (or gray) fidelity achievable by combining cyan, magenta, and yellow.

SUMMARY OF THE INVENTION

We have discovered a way of so controlling the printer as to reduce the salt-and-pepper noise greatly even when significant undercolor removal is practiced with a printer whose registration of black- and colored-ink cartridges is relatively poor. We have found that this effect can be achieved by an advantageous combination of undercolor-removal and half-toning techniques.

Specifically, we half-tone the black component independently of the color components' half-toning, and we issue print commands in response to the resultant coarse-resolution black- and color-component values independently of each other. Although a seemingly undesirable result of this independence of requests for black and colored ink is that black and colored ink can at some times be requested for the same nominal location, the result actually is advantageous when our approach is followed.

In accordance with our approach, the high-resolution black-component value derived from the values of the color components before undercolor removal is significantly less than the minimum of the three color components throughout most of the color components' range. Although the result depicted in FIG. 2 can still occasionally occur in isolated locations, the combination of this black-value-determination approach with the independence of the half-toning operations makes such occurrences infrequent.

BRIEF DESCRIPTION OF THE DRAWINGS

The following invention description refers to the accompanying drawings, of which.

DETAILED DESCRIPTION OF AN ILLUSTRATIVE EMBODIMENT

As the invention description proceeds, it will become apparent that the invention can be embodied in dedicated circuitry designed particularly to implement the invention's teachings. Such an arrangement can be included within a printer that receives instructions in terms of nominal colors or gray-scale values, and the dedicated circuitry can be designed to convert the requested values to printer instructions in accordance with the present invention's approach. But the invention will more typically be implemented by a general-purpose machine, such as a personal computer operating as a printer driver, whose purpose is to convert an image expressed in nominal color values into printer commands that comply with specified printer- and medium-dependent limitations. (Since the most-frequent use of the term driver in these contexts is colloquially to refer to the software that configures the computer to act as a driver, we will hereafter adopt the nomenclature printer controller to refer to the hardware configured for this purpose. This nomenclature will apply even to controllers not implemented in computers.)

Figure 3:
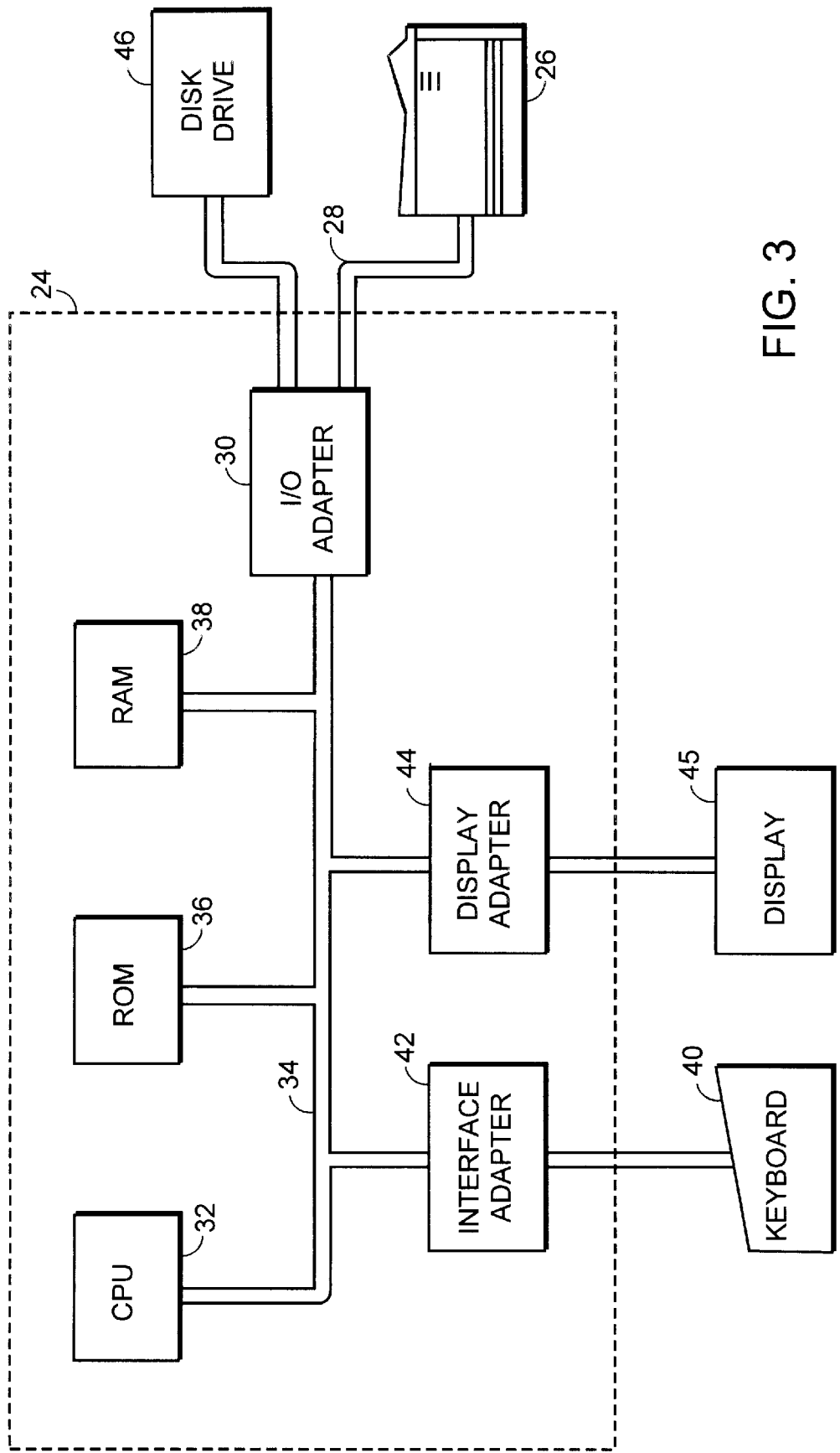
FIG. 3 is a hardware-perspective block diagram of a computer system of the type in which the present invention's teachings will most typically be practiced.

FIG. 3 depicts a typical hardware environment. A personal computer 24 sends a display device such as an ink-jet printer 26 low-level instructions, i.e., instructions that specify which individual display-medium pixels should receive dots. The drawing depicts the printer 26 as receiving these instructions by way of an appropriate channel 28. Computers that can embody the present invention come in a wide variety of configurations, and FIG. 3 depicts one in which channel 28 is provided by an input-output adapter 30 with which a central processing unit 32 communicates by way of an internal bus 34.

Of course, the central processing unit 32 typically fetches data and instructions at various times from a variety of sources, such as solid-state read-only and read-write memories 36 and 38. FIG. 3 depicts the computer 24 as also communicating with the usual keyboard 40 by way of an interface adapter 42. And a display adapter 44 usually couples a cathode-ray-tube display 45 to the central processing unit 32 by way of the bus 34.

The computer 24 typically implements the present invention's teachings when it functions as a printer controller. Operating-system software transferred to the computer's disc drive 46 and stored in a disc that the drive contains usually includes instructions that configure the computer to perform this function. The driver software will often have been loaded into the computer system from another storage medium, such as a diskette or CD-ROM. In any event, the computer 24 reads the printer-driver instructions from the disc drive in most cases and then performs the below-described functions to implement the present invention's teachings.

Figure 4:
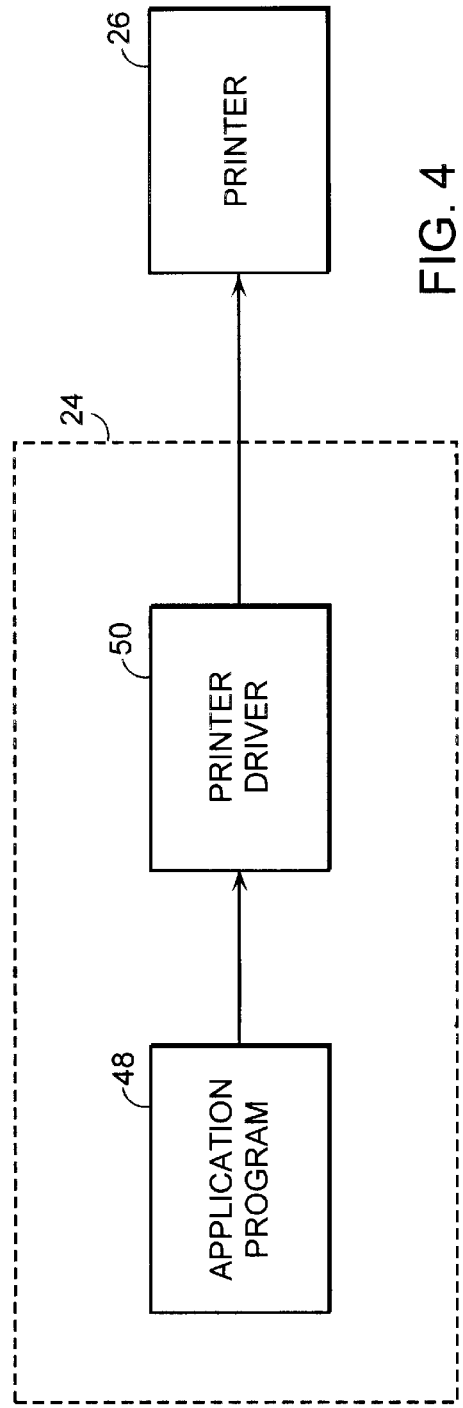
FIG. 4 is a software-perspective block diagram of the same environment.

FIG. 4 depicts the invention's environment from more of a software standpoint. The present invention's teachings usually come into play when the computer 24 is operating a user's application program 48 and that program makes a system call requesting that an image be printed. A printer driver 50, which is usually considered to be part of the operating system but is specific to the designated printer, performs the requested operation. The printer driver's purpose is to convert a device-independent representation of the image into low-level printer instructions that will cause the printer 26 to render that image as faithfully as the printer's limitations permit.

Figure 5:
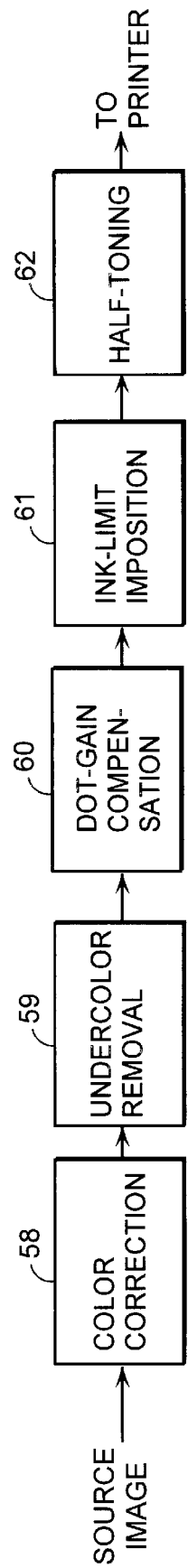
FIG. 5 is a high-level block diagram of the image-revision sequence that a printer driver employs to generate printer instructions.

The typical printer controller performs a sequence of image-revision steps to generate print instructions from signals that represent the source image. FIG. 5 represents a typical image-revision sequence. The inks employed to display the stored image do not precisely match the ideal colors that they are intended to represent, so the printer controller typically adjusts the values from those that represent combinations of ideal colors to values that will cause the non-ideal inks to approach the intended color more closely. FIG. 5's block 58 represents such a color-correction step.

In developing commands for printers that can deposit black and colored inks on the same image, some printer controllers derive a high-value-resolution black value from the color-component values and adjust the color-component values to compensate for the addition of the black component. Block 59 represents such an "undercolor-removal" step, which will be described in more detail below in connection with FIGS. 7 and 8. The controller may also revise the values to account for the fact that the apparent color darkness does not increase linearly with the percentage of pixels on which ink drops are deposited. Block 60 represents such an "dot-gain-compensation" step.

Once the controller has determined values that would cause the inks to approximate the requested colors most closely, it may need to compromise in order to observe a limit on the chosen medium's ability to absorb ink without bleeding. Block 61 represents the imposition of the necessary ink-duty limit. The result is an image in which the pixel-component values are expressed with a relatively fine resolution, such as eight or twelve bits per color component. To obtain the coarser—typically binary—resolution required for printer operation, the controller performs a half-toning step 62 that employs the present invention's teachings, and it sends instructions determined by the resultant coarse values to the printer.

Figure 6:
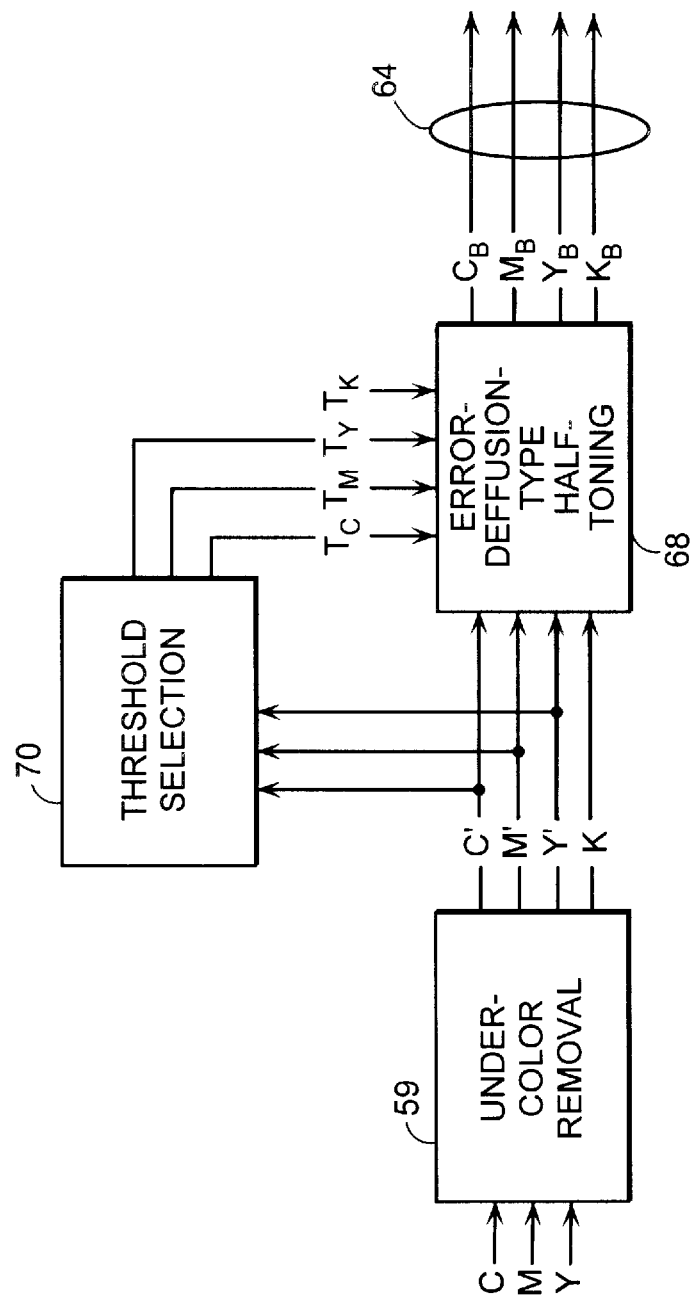
FIG. 6 is a more-detailed block diagram of the undercolor-removal and half-toning processes of FIG. 5.
Figure 7:
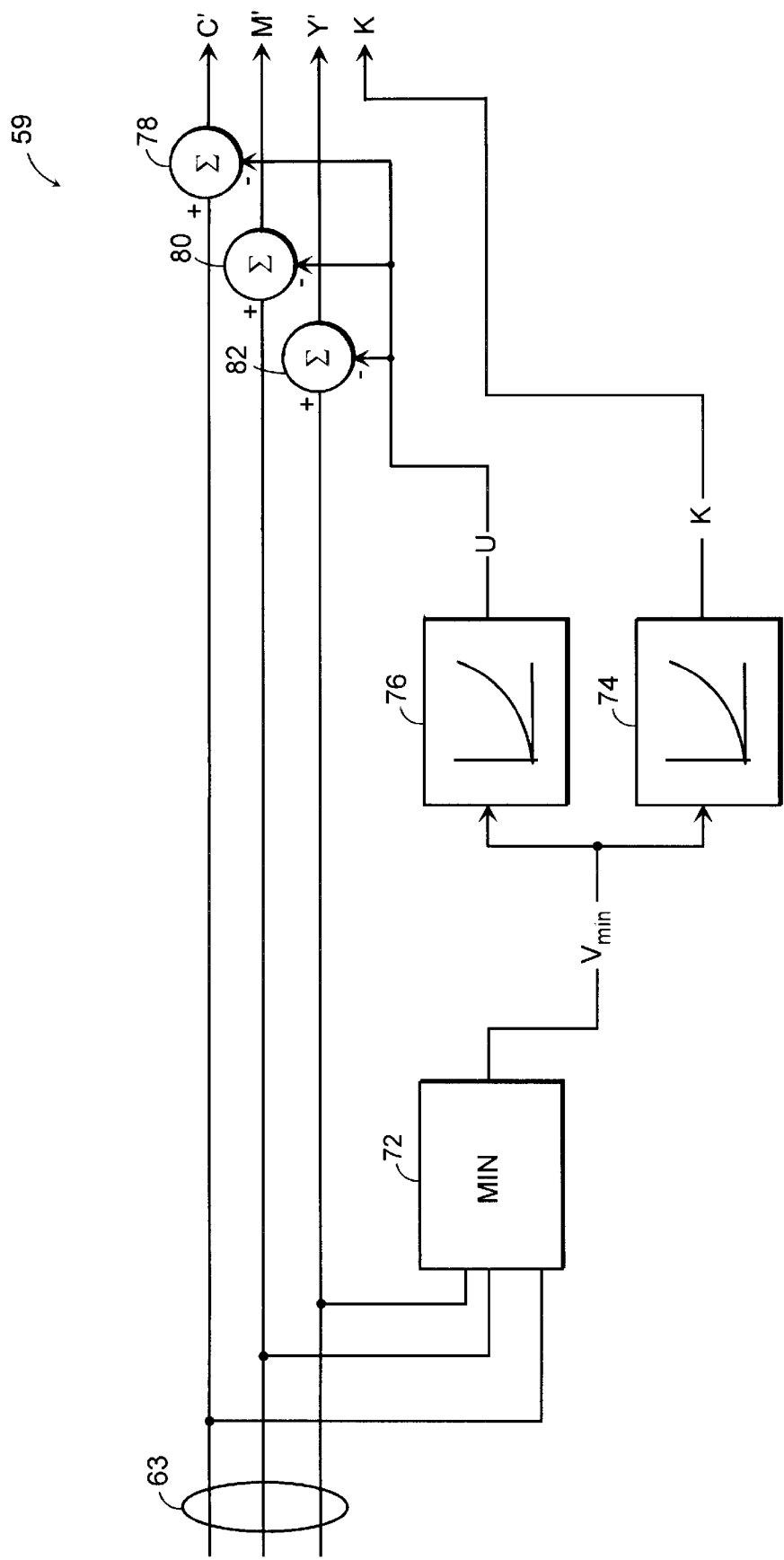
FIG. 7 is a more-detailed block diagram of the undercolor-removal process of FIG. 6.

Although the image-revision steps that FIG. 5 depicts are typical, the present invention does not require all of them, and the present invention's embodiments that do employ them all will not necessarily employ them in the illustrated order. But the undercolor-removal and half-toning operations 59 and 62 are of particular importance to various of the present invention's aspects, so FIGS. 6 and 7 illustrate them in more detail, with the other steps removed for the sake of simplicity. In a manner that will be described in more detail below by reference to FIG. 7, the undercolor-removal operation 59 determines a fine-value-resolution black value K as a function of the lowest of the cyan, magenta, and yellow values C, M, and Y that its input signal represents. The undercolor-removal process also produces adjusted fine-resolution color-component values C", M", and Y" from the input C, M, and Y values. An error-diffusion-type half-toning operation 68 generates corresponding binary values $C_B$, $M_B$, $Y_B$, and $K_B$ from these adjusted values (possibly after further processing of the type that FIG. 5 illustrates).

Each binary value is determined by comparing a corresponding fine-resolution value with a quantization threshold. In error-diffusion-type half-toning, the fine-resolution value that is compared with the quantization threshold results from adjusting a corresponding input high-resolution value C", M", Y", or K by "errors" accumulated from half-toning at nearby pixels. (Whereas the printing process is binary and thus can deposit at any given pixel a value that is only either 100% or 0% of the value range, the fine-resolution input value typically is somewhere between those values, and the difference is that pixel's error.)

The quantization threshold used in conventional error diffusion is fixed, typically at half the component-value range, and the invention's broader teachings can be employed with such fixed-threshold error diffusion. But the illustrated error-diffusion-type half-toning differs from conventional error-diffusion-type half-toning in that the choice of the quantization threshold varies in the illustrated embodiment. Specifically, the threshold-selection process 70 employs a predetermined set of three quantization thresholds, which it assigns to the cyan, magenta, and yellow components in accordance with the relative sizes of their error-adjusted values. The highest error-adjusted component value is assigned the lowest of the three quantization thresholds, the lowest is the assigned the highest, and the intermediate value is assigned the remaining quantization level. For example, if the value that results from adding diffused error to the cyan value C" is the highest of the values thus determined for the three color components, the value of the quantization threshold $T_c$ used for that component's half-toning is the lowest, whereas the other two thresholds $T_M$ and $T_Y$ are higher, their relative values being determined by the relative values of the magenta and yellow error-adjusted values.

A given color component's half-toning is thus dependent on the other components' values: there is at least one pair of combinations of the other color components' values for which at least one fine-resolution value of the given component results in a different coarse-resolution value at least at one pixel location. As is described in more detail in the commonly assigned co-pending U.S. patent application Ser. No. 08/679,644 of Shu et al. for "Error-Diffusion-Type Half-Toning Employing Adaptive Thresholding for Enhanced Smoothness," which was filed on Jul. 12, 1996, and is hereby incorporated by reference, this quantization-threshold variation results in greater smoothness than a fixed threshold affords. In accordance with the present invention, however, the half-toning of the black component is independent of the color components' half-toning; the black component's quantization level $T_K$ is a constant in the illustrated embodiment.

Figure 2:
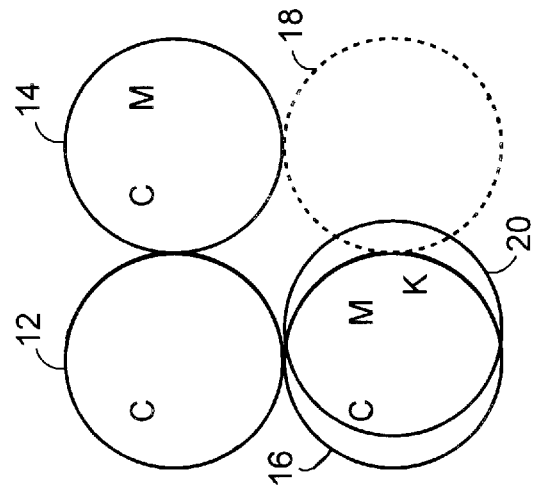
FIG. 2, described above, is a similar diagram that illustrates the results of substituting black ink for coincident cyan, magenta, and yellow ink dots.
Figure 1:
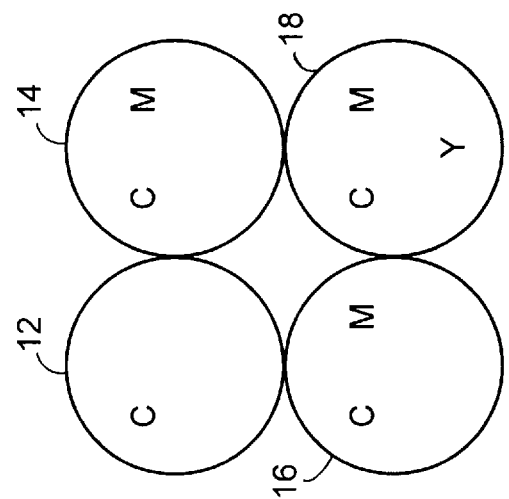
FIG. 1, described above, is a diagram of ink-dot locations on a print medium.

Moreover, the printer commands 64 are determined solely from the results of the individual components' half-toning operations. In this regard, the illustrated system differs from many conventional CMYK systems, in which the occurrence of a command to deposit black ink causes commands for the colored inks to be suppressed. Although this further independence of the black half-toning from the color half-toning yields the seemingly undesirable result of permitting black ink to be requested at the same nominal locations as colored inks, we have found that our approach causes any such undesirable effects to be far outweighed by an attendant reduction in effects of the type that FIG. 2 illustrates.

In accordance with our invention, the high-value-resolution black component K is determined in such a manner that it is relatively low for most combinations of the color components. Yet it rises to a high value in those areas in which a high-quality black is most desired. We describe one such method of black-value determination by reference to FIG. 7, which depicts FIG. 6's under-color-removal operation 59 in more detail.

Figure 8:
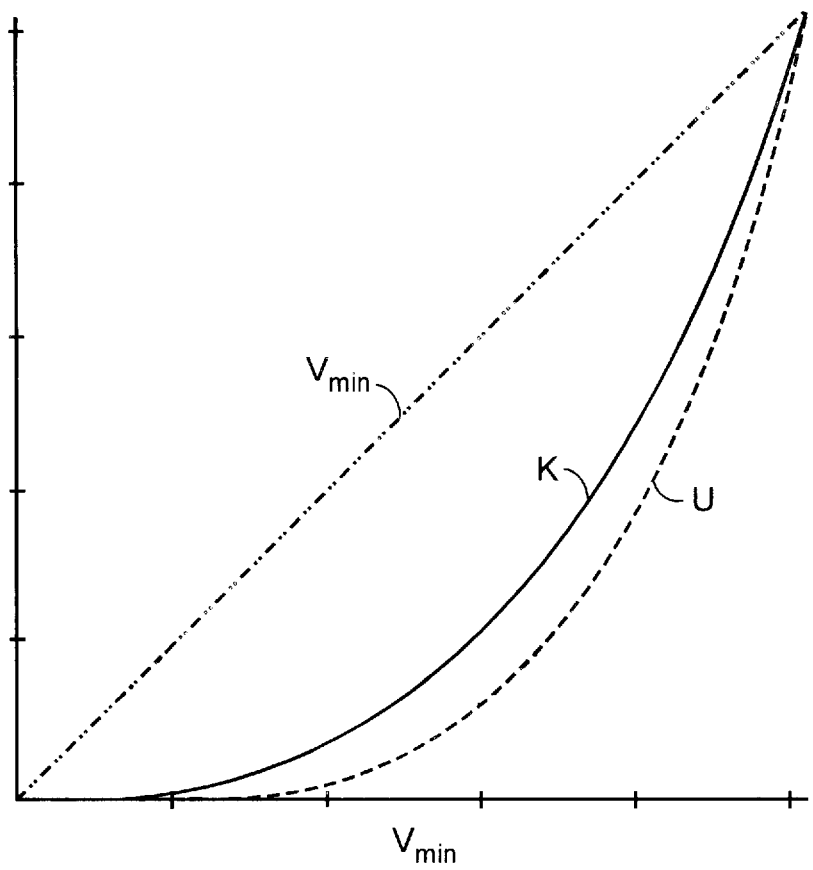
FIG. 8 is a graph that displays plots of the high-resolution black and undercolor values as functions of the undercolor-removal operation's lowest input value.

FIG. 7 includes a block 72 that represents taking the minimum of the three color-component values, and block 74 represents determining from that minimum value $V_{min}$ a fine-resolution black value K in accordance with a function represented by FIG. 8's solid-line plot. The illustrated embodiment uses the following relationship for this purpose:

$$K = 255 \cdot \left(\frac{V_{min}}{255}\right)^3,$$

but the particular function employed to obtain the fine-resolution black value is not critical. What is important to certain aspects of the invention is that throughout most of its range K is considerably less than the minimum value $V_{min}$, which the dot-dash plot represents. Indeed, the K value remains at 0 for the first part of the range in the illustrated embodiment. This is not necessary, but we prefer that the black value K bear a ratio to its value range's maximum that is less than or equal to the square of the ratio borne to its range by the color-component minimum $V_{min}$.

Note that the K value nonetheless rises rapidly to the top of the component-value range as the minimum color-component value does. It is thereby high in those regions in which cyan, magenta, and yellow dots would coincide frequently in the absence of undercolor removal. So the printer provides the high-fidelity black-ink impression in those areas that are nearly black; in such regions it avoids using the lower-fidelity composite-black impression that results from coincident cyan, magenta, and yellow.

To compensate for the black-ink addition, the printer controller adjusts the values for cyan, magenta, and yellow by subtracting an undercolor value U. Although embodiments of the present invention can derive this value from the fine-resolution black value K, an operation represented by FIG. 7's block 76 determines it from the minimum input color-component value $V_{min}$ in accordance with a function that FIG. 8's dashed-line plot represents. Operations that FIG. 7 represents by symbols 78, 80, and 82 determine the color-component inputs C", M", and Y to FIG. 6's half-toning operation 68 by subtracting this undercolor value U from the input component values C, M, and Y.

FIG. 8's dashed-line plot shows that the function employed for deriving the undercolor value U is similar to that which resulted in the high-resolution black value K. The illustrated embodiment uses the following relationship for this purpose:

$$U = 255 \cdot \left(\frac{V_{min}}{255}\right)^4 ;$$

i.e., the undercolor-removal value U is less than the fine-resolution black value. This is not a necessary feature of the present invention, but we have found that it results in more-vivid colors.

The present invention largely suppresses the salt-and-pepper noise that heretofore had attended attempts to use undercolor removal in relatively low-cost printers. It therefore constitutes a significant advance in the art.

What is claimed is:

1. For operating an ink-jet printing mechanism to produce a display in response to electrical source-image signals representing a source image consisting of an array of pixels, the value of each of which consists of more than one relatively fine-resolution component value associated with that pixel, a method comprising the steps of:
   A) performing a sequence of at least one image-revision step, in which sequence each image-revision step receives an input image consisting of input pixels and produces therefrom an output image consisting of output pixels, the input image of the first image-revision step is the source image, the input image of any subsequent image-revision step is the output image of the preceding image-revision step, and one said image-revision step is a half-toning step each input pixel of whose input image consists of fine-resolution half-tone-input color components and a fine-resolution half-tone-input black component, the half-toning step including:
      i) performing on each fine-resolution half-tone-input color component a respective half-toning operation that generates a corresponding coarse-resolution color value therefrom;
      ii) performing on each fine-resolution half-tone-input black component a half-toning operation that generates a corresponding coarse-resolution black value therefrom, the half-toning operation performed on the fine-resolution half-tone-input black components being independent of the fine-resolution half-tone-input color components' values;
   B) operating the printing mechanism to apply to a print medium black ink independently of the coarse-resolution color values in accordance with the coarse-resolution black value; and
   C) operating the printing mechanism to apply to a print medium colored ink independently of the coarse-resolution black values in accordance with the coarse-resolution color values.

2. A method as defined in claim 1 wherein the half-toning operation performed on at least one of the components is dependent on the other color components' values.

3. A method as defined in claim 2 wherein:
   A) the respective half-toning operation performed on each half-tone-input color components is an error-diffusion half-toning operation that includes obtaining an error-adjusted value from that half-tone-input color component and generating the coarse-resolution color value in accordance with a comparison of the error-adjusted value with a respective quantization threshold; and
   B) the quantization thresholds employed in the half-tone operations performed on different color components of a given pixel are not all the same if the error-adjusted values obtained from the half-tone-input color components of the given pixel are not all the same.

4. A method as defined in claim 3 wherein the quantization threshold employed in a half-toning operation performed on one half-tone-input color component of a given pixel is lower than the quantization threshold employed in a half-toning operation performed on an other half-tone-input color component of the given pixel if the error-adjusted value obtained from the one half-tone-input color component is greater than the error-adjusted value obtained from the other half-tone-input color component.

5. A method as defined in claim 1 wherein one image-revision step of the sequence of at least one image-revision step is a black-value-derivation step each input pixel of whose input image consists of fine-resolution black-value-derivation-input color components and each output pixel of whose output image corresponds to a respective one of the input pixels of the black-value-derivation step's input image and consists of fine-resolution black-value-derivation-output color components and a fine-resolution black-value-derivation-output black component that the black-value-derivation step determines in accordance with a function of the respective input pixel's black-value-derivation-input color components in which the value of the black-value-derivation-output black component is less than the minimum of the black-value-derivation-input color components' values throughout most of that minimum's range.

6. A method as defined in claim 5 wherein:
   A) the black-value-derivation-input color components and black-value-derivation-output black component are expressed within a range that has a range maximum value; and
   B) the ratio that the black-value-derivation-output black component bears to the range maximum value is less than or equal to the square of the ratio that the minimum of the black-value-derivation-input color components' values bears to the range maximum.

7. A storage medium containing instructions readable by a computer to configure the computer to function as a printer controller for operating an ink-jet printing mechanism to produce a display in response to electrical source-image signals representing a source image consisting of an array of pixels, the value of each of which consists of more than one relatively fine-resolution component value associated with that pixel, which controller comprises:
   A) image-revision circuitry for performing a sequence of at least one image-revision step, in which sequence each image-revision step receives an input image consisting of input pixels and produces therefrom an output image consisting of output pixels, the input image of the first image-revision step is the source image, the input image of any subsequent image-revision step is the output image of the preceding image-revision step, and one said image-revision step is a half-toning step each input pixel of whose input image consists of fine-resolution half-tone-input color components and a fine-resolution half-tone-input black component, the half-toning step including:
  i) performing on each fine-resolution half-tone-input color component a respective half-toning operation that generates a corresponding coarse-resolution color value therefrom; and
  ii) performing on each fine-resolution half-tone-input black component a half-toning operation that generates a corresponding coarse-resolution black value therefrom, the half-toning operation performed on the fine-resolution half-tone-input black components being independent of the fine-resolution half-tone-input color components' values; and
B) output circuitry for:
  i) operating the printing mechanism to apply to a print medium black ink independently of the coarse-resolution color values in accordance with the coarse-resolution black value; and
  ii) operating the printing mechanism to apply to a print medium colored ink independently of the coarse-resolution black values in accordance with the coarse-resolution color values.

8. A storage medium as defined in claim 7 wherein the half-toning operation performed on at least one of the components is dependent on the other color components' values.

9. A storage medium as defined in claim 8 wherein:
A) the respective half-toning operation performed on each half-tone-input color components is an error-diffusion half-toning operation that includes obtaining an error-adjusted value from that half-tone-input color component and generating the coarse-resolution color value in accordance with a comparison of the error-adjusted value with a respective quantization threshold; and
B) the quantization thresholds employed in the half-tone operations performed on different color components of a given pixel are not all the same if the error-adjusted values obtained from the half-tone-input color components of the given pixel are not all the same.

10. A storage medium as defined in claim 9 wherein the quantization threshold employed in a half-toning operation performed on one half-tone-input color component of a given pixel is lower than the quantization threshold employed in a half-toning operation performed on an other half-tone-input color component of the given pixel if the error-adjusted value obtained from the one half-tone-input color component is greater than the error-adjusted value obtained from the other half-tone-input color component.

11. A storage medium as defined in claim 7 wherein one image-revision step of the sequence of at least one image-revision step is a black-value-derivation step each input pixel of whose input image consists of fine-resolution black-value-derivation-input color components and each output pixel of whose output image corresponds to a respective one of the input pixels of the black-value-derivation step's input image and consists of fine-resolution black-value-derivation-output color components and a fine-resolution black-value-derivation-output black component that the black-value-derivation step determines in accordance with a function of the respective input pixel's black-value-derivation-input color components in which the value of the black-value-derivation-output black component is less than the minimum of the black-value-derivation-input color components' values throughout most of that minimum's range.

12. A storage medium as defined in claim 11 wherein:
A) the black-value-derivation-input color components and black-value-derivation-output black component are expressed within a range that has a range maximum value; and
B) the ratio that the black-value-derivation-output black component bears to the range maximum value is less than or equal to the square of the ratio that the minimum of the black-value-derivation-input color components' values bears to the range maximum.

13. For printing an image in response to electrical source-image signals representing a source image consisting of an array of pixels, the value of each of which consists of more than one relatively fine-resolution component value associated with that pixel, an apparatus comprising:
A) an ink-jet printing mechanism operable to apply black and colored ink to a print medium;
B) image-revision circuitry for performing a sequence of at least one image-revision step, in which sequence each image-revision step receives an input image consisting of input pixels and produces therefrom an output image consisting of output pixels, the input image of the first image-revision step is the source image, the input image of any subsequent image-revision step is the output image of the preceding image-revision step, and one said image-revision step is a half-toning step each input pixel of whose input image consists of fine-resolution half-tone-input color components and a fine-resolution half-tone-input black component, the half-toning step including:
  i) performing on each fine-resolution half-tone-input color component a respective half-toning operation that generates a corresponding coarse-resolution color value therefrom; and
  ii) performing on each fine-resolution half-tone-input black component a half-toning operation that generates a corresponding coarse-resolution black value therefrom, the half-toning operation performed on the fine-resolution half-tone-input black components being independent of the fine-resolution half-tone-input color components' values; and
C) output circuitry for:
  i) operating the printing mechanism to apply black ink to the print medium independently of the coarse-resolution color values in accordance with the coarse-resolution black value; and
  ii) operating the printing mechanism to apply colored ink to the print medium independently of the coarse-resolution black values in accordance with the coarse-resolution color values.

14. An apparatus as defined in claim 13 wherein the half-toning operation performed on at least one of the components is dependent on the other color components' values.

15. An apparatus as defined in claim 14 wherein:
A) the respective half-toning operation performed on each half-tone-input color components is an error-diffusion half-toning operation that includes obtaining an error-adjusted value from that half-tone-input color component and generating the coarse-resolution color value in accordance with a comparison of the error-adjusted value with a respective quantization threshold; and
B) the quantization thresholds employed in the half-tone operations performed on different color components of a given pixel are not all the same if the error-adjusted values obtained from the half-tone-input color components of the given pixel are not all the same.

16. An apparatus as defined in claim 15 wherein the quantization threshold employed in a half-toning operation performed on one half-tone-input color component of a given pixel is lower than the quantization threshold employed in a half-toning operation performed on an other half-tone-input color component of the given pixel if the error-adjusted value obtained from the one half-tone-input color component is greater than the error-adjusted value obtained from the other half-tone-input color component.

17. An apparatus as defined in claim 13 wherein one image-revision step of the sequence of at least one image-revision step is a black-value-derivation step each input pixel of whose input image consists of fine-resolution black-value-derivation-input color components and each output pixel of whose output image corresponds to a respective one of the input pixels of the black-value-derivation step's input image and consists of fine-resolution black-value-derivation-output color components and a fine-resolution black-value-derivation-output black component that the black-value-derivation step determines in accordance with a function of the respective input pixel's black-value-derivation-input color components in which the value of the black-value-derivation-output black component is less than the minimum of the black-value-derivation-input color components' values throughout most of that minimum's range.

18. An apparatus as defined in claim 17 wherein:

A) the black-value-derivation-input color components and black-value-derivation-output black component are expressed within a range that has a range maximum value; and B) the ratio that the black-value-derivation-output black component bears to the range maximum value is less than or equal to the square of the ratio that the minimum of the black-value-derivation-input color components' values bears to the range maximum.

* * * * *